Sept. 16, 1952

E. WEBER ET AL 2,610,606

APPARATUS FOR THE FORMATION OF METALLIC FILMS BY THERMAL EVAPORATION

Original Filed Sept. 26, 1946

INVENTORS

Ernst Weber

Stanley A. Johnson

BY Ralph B. Stewart

ATTORNEY

Patented Sept. 16, 1952 2,610,606

UNITED STATES PATENT OFFICE 2,610,606

APPARATUS FOR THE FORMATION OF METALLIC FILMS BY THERMAL EVAPORATION

Ernst Weber, Mount Vernon, and Stanley A. Johnson, New York, N. Y., assignors to Polytechnic Institute of Brooklyn, Brooklyn, N. Y., a corporation of New York Original application September 26, 1946, Serial No. 699,546. Divided and this application February 24, 1949, Serial No. 78,164

3 Claims. (Cl. 118—49)

This invention relates to the formation of metallic films by thermal evaporation, and it is concerned with the apparatus used in the production of such films. The present application is a division of our copending application Serial No. 699,546, filed September 26, 1946.

The present invention was developed especially for the production of thin metallic films on dielectric carriers for use as electrical resistance elements, especially in applications involving high frequency and ultra-high frequency currents. It will be understood, however, that the invention may be used for the formation of metallic films for any purpose.

Specifically the problem back of the present invention was that of producing resistance elements of rugged construction and having highly stable characteristics adapting them for use in the precision measurement an dcontrol of currents of extremely high frequency. Resistance elements for this purpose must be formed of metallic films having the characteristics of excellent resistance stability, frequency insensitivity, low temperature coefficient, and uniformity. The film must also be resistant to mechanical abrasion and oxidation, and must be temperature stable and unaffected by humidity.

Such resistance elements are especially useful as attenuator units which dissipate some of the electric energy in the form of joule losses in the metal film. For this purpose, it is important that the film be of very small thickness, preferably less than the depth of penetration of the current, and this requirement involves certain difficulties as will be explained later.

It has long been known that thin metallic films could be formed on dielectric carriers by thermal evaporation of the metal to be deposited and allowing the vapor of the metal to condense on the relatively cool surface of the carrier. In attempting to develop electrical resistance elements by this method, in which the metal to be evaporated was placed on a heater filament, applicants soon discovered that thin metallic films formed in this manner may have a number of undesirable characteristics which render them unsuited for the purposes referred to above. For example, it was found that depending upon the conditions under which the film was formed, there might be aging effects in which there is a relatively slow change in resistance value of the film with time; under certain conditions, especially where it was attempted to build up films greater than a certain thickness, there was a tendency for the films to flake or peel from the carrier surface; films formed from pure metals have resistance values which varied with temperature; the material of the vaporizing heater filament may adversely affect the film; and if the film is extremely thin it will have unstable resistance.

The present invention involves the process and apparatus by which it is possible to produce very thin metallic films of very stable characteristics and of rugged mechanical construction. Furthermore, the process produces uniform results in successive operating cycles.

In producing resistance elements for the purposes indicated above the films should be free from oxidation or corrosion when exposed to air. This requirement naturally suggests the use of noble metals such as gold and platinum for the film material, but it was found that in films produced from these metals having a reasonable amount of resistivity, the thickness of the film is only a few times greater than the molecular diameter, and the resistance of the film is unstable. In order to obtain a film of the required thickness for resistance stability, and to be free from variations with temperature, the film material is formed of an alloy having considerably higher resistivity than the noble metals and having a low temperature coefficient. Applicants discovered that for use in the evaporation process, the alloys must be formed of component metals having approximately the same melting point if the resulting film is to have the same electrical characteristic as that of the alloy. Alloys suitable for this purpose are those commonly known as "Nichrome" (nickel and chromium), "Constantan" (nickel and copper) and "Lucero" (copper and nickel). In order to obtain stability of resistance value, the film thickness must be of the order of 50 molecules or greater. For "Nichrome," which is the preferred alloy, the film should have a thickness of the order of 100 angstrom units or greater.

In order to insure against the effects of oxidation and corrosion, a protective coating is applied to the resistance unit immediately after the metal film is formed and while the unit is still under vacuum. This coating may be formed by evaporation of quartz, but the preferred material for the coating is magnesium fluoride. A coating of this material, about ten or more millionths of an inch thick, not only protects the film from chemical deterioration, but also prevents mechanical injury to the resistance film by reason of the great hardness and strength of the fluoride coating.

Applicants have discovered that in producing resistance elements having the characteristics referred to above, the following five conditions must be satisfied in the formation of a film of "Nichrome" evaporated from a tungsten filament:

1. The dielectric carriers to be coated, usually in the form of glass plates or rods, must be thoroughly cleaned of all contaminating substance of any sort such as dust, lint, and any organic or inorganic deposits of any type which might prevent strong bonding or adhesion of the film to the carrier. Even a slight surface contamination will cause considerable non-uniformity of the film. The vaporizing apparatus should also be cleaned of contaminating substances.

2. During the formation of the film on the carrier, the carrier should be maintained at a temperature not less than 300° C. and not appreciably greater than 350° C. This condition is necessary to secure a strong bond between the film and the carrier. Satisfactory adhesion of the film to the carrier is not obtained for temperature below this range and the film is not uniform and is subject to aging. The aging effect is probably due to the reorientation of the crystalline batches of metal particles when the batches are heated by an electric current passing through them. The proper heating of the carrier during evaporation permits the required orientation to take place while the metal is being deposited.

Insufficient heating of the carrier during evaporation also results in a considerably higher temperature coefficient of resistance of the film.

If the carrier is heated higher than 350° C. gases released from the metal parts of the apparatus prevent the formation of smooth, uniform films. Also, the heater wires used to heat the carrier parts may even start to emit and deposit a metal film on the reverse side of the carrier parts.

3. Where the metal being evaporated contains an element which has a dissolving effect on the vaporizing filament, there should be an adequate supply of coating metal on the filament to completely cover the filament during the entire cycle of evaporation. If an adequate supply of coating metal is not provided, the coating metal will become contaminated by the dissolved metal of the filament, and a strong aging effect results. In the case of "Nichrome" applied to a tungsten filament, the nickel tends to dissolve the tungsten. If too much "Nichrome" is present on the filament during evaporation, there is danger that the filament may be weakened by the dissolving of the tungsten to such an extent that the filament will break. The specific amount of "Nichrome" employed in the process will be explained later.

4. The speed of evaporation and the time of the evaporation cycle are also important factors.

The speed of evaporation is necessarily dependent upon the temperature of the heater filament. If the temperature of the filament is too low, the metal molecules, having lower speed, may not form a strong bond with the carrier and the resulting filament becomes mechanically unstable. At higher temperatures, the released molecules, of "Nichrome" travel at higher speed and penetrate into the outermost molecular layer of the carrier and form a strong bond resulting in a smooth and durable film. The actual temperature of the filament during evaporation has not been determined, but the filament employed in applicant's work consists of three 20 mil tungsten wires plaited together and carrying a total current of 30 amperes which should produce a temperature in the neighborhood of 1300 to 1400° C.

With regard to the time for each filament evaporation cycle, considerable experimentation has shown that evaporation from a single vaporizing filament should not continue for a period longer than three minutes. A longer time of evaporation is likely to cause contamination of the deposited film by dissolved tungsten from the heater filament.

Where a film thickness is required greater than that which can be obtained by the evaporation from a single filament in a three-minute period, it is necessary to build up the film by the evaporation from a number of filaments energized in succession. Also, we have found that it is not possible to use a tungsten filament for more than one evaporation cycle in evaporating "nichrome."

5. The bell jar in which the evaporation takes place must be maintained at the proper pressure during the formation of the film. This pressure must be less than $10^{-4}$ mm. of mercury in order to obtain mechanically strong, non-aging films. For consistent results and uniform films a pressure of 6 or $7 \times 10^{-5}$ mm. of mercury or less should be used. At lower pressures, the mean free path of the molecules is considerably greater and, therefore, the kinetic energy is greater, thus resulting in a stronger bond. In the apparatus employed, the mean free path of the metal molecules is about twice the maximum distance of travel of the molecule. The chance of collision with remaining gas molecules is considerably reduced, and most of the metal molecules will keep their high kinetic energy until they strike the carrier.

Suitable apparatus for carrying out the present invention is illustrated in the accompanying drawing in which.

Figure 3:
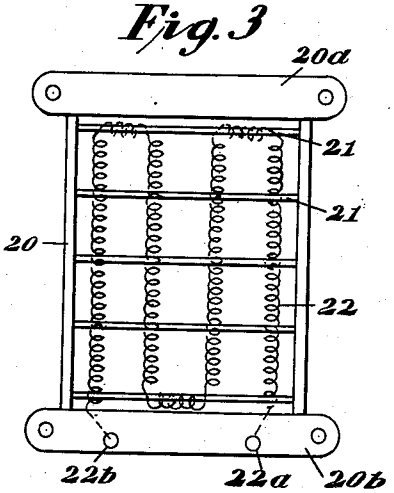
Figure 3 is a view of the heating hood from the underside thereof.
Figures 4, 5:
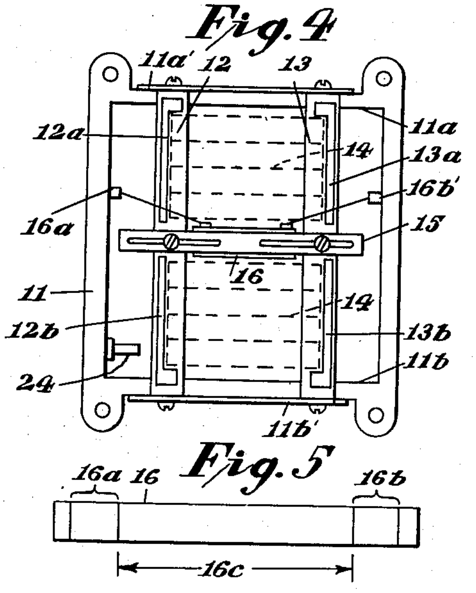
Figure 4 is a top plan view of the carrier supporting jig.
Figure 5 is an enlarged plan view of a test strip employed for determining the thickness of the deposited film during evaporation.

Figures 3 and 4 are on a somewhat larger scale than Figures 1 and 2 and Figures 5 and 6 are on a still larger scale. The various figures of the drawing are somewhat diagrammatic.

Figure 1:
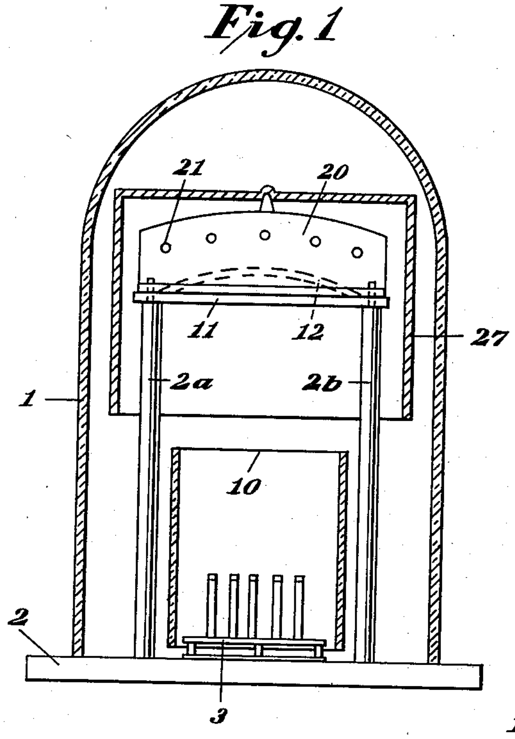
Figure 1 is a side elevational view showing the apparatus enclosed within a vacuum bell jar, certain parts being shown in vertical section.

The apparatus consists of a bell jar construction such as a glass bell 1 shown in vertical section in Figure 1 and seated upon a base plate 2 which is provided with an opening at the center thereof and connected with a suitable evacuating system, not shown. Four vertical rods or standards 2a, 2b, 2c and 2d are mounted upon plate 2 within bell 1 and are provide with reduced extensions on their upper ends. A terminal plate 3 is mounted above the center of base plate 2 and carries on the upper face thereof a plurality of vertical terminal posts. A pair of these terminal posts arranged on opposite sides of the plate 3 support a horizontal heater filament 4. Similar heater filaments 5 and 6 are supported in closely spaced parallel relation with filament 4 by corresponding pairs of terminal posts. Two additional pairs of terminal posts support two horizontal filaments which carry cups 7 and 8 for vaporizing the material to form the protective coating. One terminal of each pair of filament terminals is grounded to base plate 2, and the remaining terminals for the different filaments are connected respectively to insulated terminals *4a*, *5a*, *6a*, *7a*, *8a* mounted on base 2 within the jar 1.

Surrounding the terminal plate 3 and extending upwardly is an open ended glass cylinder 10 (shown in section in Figure 1) provided to protect the jar 1 and other parts of the apparatus from molecular radiation from the metal being evaporated and from the filaments. This protective cylinder prevents the formation of a metallic film on the interior of the jar 1 and greatly reduces the labor in keeping the interior wall of the jar clean.

A carrier supporting jig is supported at the upper end of rods *2a*, *2b*, *2c*, *2d*. The jig has a main frame 11 of rectangular shape, as shown in Figure 4, and is provided with outwardly extending, perforated ears or flanges at the corners through which the reduced ends of the supporting rods extend. The perforated flanges of the carrier jig serve to support the jig on the vertical rods by resting upon shoulders formed on the respective rods near their upper ends and located in a common horizontal plane. Two curved rails 12 and 13 are supported on frame 11 with their ends resting upon frame sides *11a* and *11b* respectively. The rail sides *11a* and *11b* have secured to their outer edges vertical strips *11a′* and *11b′* which extend above the sides *11a* and *11b* and are provided with longitudinal slots through which suitable screws pass and have threaded engagement with the ends of rails 12 and 13. By this construction it is possible to adjust the distance of separation between the rails 12 and 13 to adapt these rails to support carriers of different lengths and to clamp the rails in adjusted position. In Figure 4 of the drawing, the two rails 12 and 13 are shown supporting eight carrier pieces which usually are in the form of flat glass plates shown in dotted lines at 14, four pieces arranged on opposite sides of the center of the rails.

Suitable metal strips *12a*, *12b* and *13a*, *13b* are adjustably secured to rails 12 and 13, respectively, and serve as stops to prevent longitudinal movement of the glass plates 14 when they are mounted on the rails. By adjusting the position of these end stop strips on the rails 12 and 13, it is possible to adjust the extent of the end portions of the plates 14 which are shielded by the rails 12 and 13.

As will be seen from Figure 1, the rails 12 and 13 are of arcuate shape tand the center of curvature of these rails is positioned substantially at the filament 4, thus supporting the plates 14 at equal distances from the evaporating filament. The distance from the filament to the plates being coated is preferably of the order of 15 inches; the greater the distance the more uniform will be the films deposited on the different carrier platss.

At the center of the two rails is mounted a transverse spacer strip 15 which spans the two rails and is provided with longitudinal slots through which suitable clamping screws pass and have threaded engagement with the rails 12 and 13 as shown. The purpose of the strip 15 is to hold the center portions of the two rails in proper spaced relation.

Supported immediately beneath the spacer strip 15 at the center of the carrier jig, and at the same distance from the filament as the plates 14, is a test strip 16 which is illustrated in greater detail in Figure 5. This test strip is made of the same material as the plates being coated and preferably is of the same width. Terminal portions *16a* and *16b* of the test strip is provided with metallic coatings of low conductivity, and these terminal coatings are spaced apart a known distance *16c* convenient for determining the thickness of the film during evaporation. These terminal coatings may be formed by applying a coating of gold-platinum paste to the end portions of the strip and reducing these coatings to an adherent metallic coating by the usual burning-on process employed in the art of metallizing glass. The terminal portions *16a* and *16b* are connected to suitable electric terminals *16a′* and *16b′* mounted on frame 11, and the connections to the terminal portions of the strip are secured by means of a special clamp illustrated in Figure 6. This clamp involves a single metal strip 17 having the outer end thereof bent into a V formation with the outer leg *17a* of the V bearing against the upper face of the plate 16, and the other leg *17b* extending underneath the plate and having a clamping screw 18 threaded therein and extending into engagement with the terminal coating on the plate.

Figure 2:
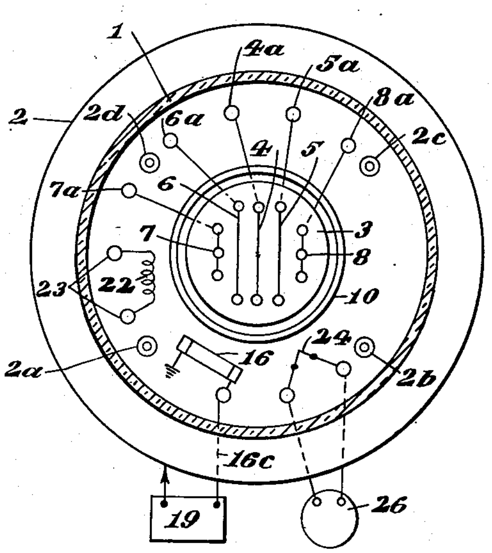
Figure 2 is a plan view of Figure 1 with the heating hood and the carrier supporting jig removed from the vertical standards.
Figure 6:
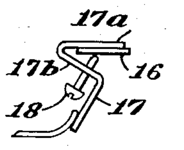
Figure 6 is an end view of the test strip showing a connector applied thereto.

One of the terminals of the test strip mounted on frame 11 is grounded to the base plate 2 while the other terminal is connected to an insulated terminal *16c* mounted on plate 2 as shown in Figure 2. This terminal is connected to a suitable resistance measuring instrument such as a Wheatstone bridge diagrammatically represented at 19 in Figure 2. By this arrangement it is possible to measure the resistance of the test strip 16 at any time during the evaporation process.

Supported immediately above the plate jig on vertical rods *2a*—*2d* is a heater unit for maintaining the carrier plates 14 at a predetermined temperature during the coating process. This heater unit is formed of a metallic box 20 of rectangular shape and mounted in an inverted position above the carrier jig by two end pieces *20a* and *20b* resting upon the perforated flanges of the carrier jig and provided with four holes which receive the reduced extensions on the upper end of rods *2a*, *2b*, *2c* and *2d*. The box or hood 20 preferably is formed of sheet copper, and the bottom of the box is of arcuate shape curved about filament 4 as a center, as shown in Figure 1. A plurality of insulating rods 21 are mounted within the box 20 transversely thereof and in an arcuate formation, see Figures 1 and 3. These rods serve to support a heating filament 22 which is arranged within the hood in the manner shown in Figure 3 and is connected to two insulated terminals *22a* and *22b* mounted on the end piece *20b*. These terminals are connected by suitable wires, not shown, to insulated terminals 23 mounted on base plate 2, see Figure 2, and terminals 23 are connected through a current adjusting device to a suitable source of heating current. A temperature measuring element is mounted in the vicinity of the carrier plates 14, and this element conveniently may be in the form of a thermocouple 24 mounted on the plate jig as shown in Figure 4. This thermocouple is connected by suitable connections to a pair of terminals 25 mounted on plate 2 and these terminals are connected to a suitable indicating instrument represented at 26. It will be noted that the curved carrier supporting rails 12 and 13 of the carrier jig extend upwardly into the heater box 20 and the box completely surrounds the carriers mounted on these rails.

A cylindrical heat shield 27, preferably formed of sheet copper and closed at the upper end, is supported from the heating box 20 and surrounds this box and extends down to a point near the upper end of cylindrical shield 10 shown in Figure 1. The purpose of the shield 27 is to protect the bell 1 from the heat of the plate heating unit, and to provide additional protection for the jar against the deposit of metallic film on the inner surface thereof during evaporation.

The evaporation procedure is as follows: The entire inner surface of the bell jar 1, and the surfaces of all parts within this jar, must first be thoroughly cleaned of all contaminating materials. The carrier plates also must be thoroughly cleaned before being mounted upon the plate jig. Care should be taken not to handle the plates by the hand after they have been cleaned.

It will be understood that filaments 4, 5 and 6 have previously been prepared. Each of these filaments is formed of three strands of 20 mil tungsten wire plaited together at the central portion and connected to the supporting terminal posts. Around the plaited central portion of each filament is closely wound 24 inches of 10 mil "Nichrome" wire.

A suitable quantity of powdered magnesium fluoride is placed in each of the cups 7 and 8 before the shield 10 is placed around the terminal plate 3.

The carrier plates 14 and the test strip 16 are mounted upon the plate jig, and the jig is then placed in position at the top of the rods *2a*—*2d*. The necessary connections are made from the test strip 16 and the thermocouple 24 to the appropriate terminals on base 2. The heater unit is now mounted on top of the plate jig and connected to the appropriate terminals on base 2, and after this the heat shield 27 is supported on the heater unit, then the jar 1 is placed in position on the plate 2 and the evaporation cycle may be started.

It will be understood that the plate 2 is provided with suitable connections not shown for vacuum gauges such as a Pirani gauge and an ionization gauge. The bell jar is first evacuated to a pressure of $6\times10^{-4}$ mm. or lower before current is applied to the heater filament 22. Evacuation is continued during heating of the interior of the jar by the heater 22, and when the temperature within the jar rises to 350°, as indicated by the meter 26, the heater is turned off, and the evacuation is continued until the pressure drops to 6 or $7\times10^{-5}$ mm. When this pressure is reached, the heater is turned on again, and when the temperature rises to 300° C., the heating current is controlled to maintain the temperature within the jar not lower than 300° C. and not greater than 350° C.

With the pressure at 6 or $7\times10^{-5}$ mm. or less, the evaporation may be started by switching in one of the vaporizing filaments 4, 5 or 6. The current in the filament is increased to a value sufficient to melt the "Nichrome" wire on the filament, and this requires about 30 amperes with the filament mentioned above. The melted "Nichrome" clings to the vaporizing filament and completely surrounds the central portion thereof which operates at high temperature, and the molecular radiation from the "Nichrome" is deposited on the plates 14.

During the evaporation, the resistance of the test strip may be measured by the bridge 19, and since the resistance value of the test strip bears a very definite relation to the resistance value of the film deposited on the plates 14, the reading of the bridge 19 may be translated into indications of the resistance of the films on the plates 14. If the desired resistance value is obtained in less than three minutes of evaporation, the process is stopped by denergizing the filament when the resistance reading reaches the correct value. If the required resistance is lower than that which can be obtained in three minutes of evaporation, the filament is disconnected, and a new filament is energized to continue the process until the desired resistance value is obtained. Care should be taken not to allow any single filament to continue operation beyond three minutes. While only three vaporizing filaments have been shown in the drawing, it will be understood that any desired number may be provided. During the evaporation of "Nichrome," it is important that the pressure within the jar 1 not rise to a value greater than 6 or $7\times10^{-5}$ mm. It will be found that during actual evaporation of the "Nichrome," the pressure will be of the order of 3 to $5\times10^{-5}$ mm.

After the metallic film has been deposited, and while still maintaining the low pressure within the jar, one or both of the heater filaments are energized for cups 7 and 8 to vaporize the fluoride and deposit a protective coating on the metal films deposited on the plates 14. After all of the fluoride has been evaporated, the filaments are de-energized. The evaporizing cycle is now at an end, and the pressure within the jar may be gradually increased until the jar may be opened for removing the coated plates.

For successful operation, it is necessary after each coating cycle to thoroughly clean the apparatus within the bell jar, and it is especially important to remove the film deposited on the inside of the shield 10. This may be done by using steel wool and a suitable cleaning powder or grease dissolving detergent. Other parts of the apparatus, including the interior of the bell jar, should be wiped clean with a cloth wet with acetone.

For successful results, it is also important that a vaporizing filament shall not be used for more than one vaporizing cycle, but a new filament with a new supply of "Nichrome" should be provided for each cycle, since the tungsten filament, once used, becomes very brittle and is apt to break upon reuse. Also, the molten nickel has dissolved some of the tungsten of the filament, and reuse of the filament would result in contamination of the deposited film by the tungsten. By providing a larger quantity of "Nichrome" than normal on the evaporizing filament, the tungsten is coated with a "Nichrome" layer so thick that a satisfactory film can be formed before the dissolved tungsten has time to diffuse through the "Nichrome" layer to the surface.

It has already been indicated that it is important not to continue the vaporizing cycle of any single filament for more than three minutes. The amount of vaporization permissible from a single filament may also be determined by the resistance value of the film deposited on the test strip. For example, when using a test strip 3/8 of an inch wide and having a distance of 2 inches between the terminal coatings, the evaporation from a single filament should not be continued after the test strip attains a resistance value of 1000 ohms, assuming that the conditions of evaporation are those indicated previously.

After the coated plates 14 have been removed from the bell jar, suitable terminals may be attached to the end portions of the plates, thus adapting them for use as resistance elements. It will be understood, however, that terminal members in the form of low resistance coatings on the end portions of the strips may be applied before the films are deposited on the plates.

We claim:

1. In thermal evaporation apparatus, the combination of a bell jar having a base plate, a vaporizing filament supported on said plate in the lower part of said jar, a plurality of vertical rods supported on said plate within said jar and having their upper ends located in a common plane, a carrier jig removably supported upon the upper ends of said rods and including a curved carrier supporting structure having its center of curvature located substantially at the location of said vaporizing filament, a heater unit comprising an inverted metallic box positioned above said carrier jig and having the open edge thereof resting upon said jig, whereby said box entirely surrounds said carrier supporting structure of said jig, a heater element mounted within said box above the said carrier supporting structure, and a metallic cylinder closed at its upper end and being removably supported upon said metallic box with the open end thereof extending downwardly to surround and enclose said carrier jig and said heater unit.

2. Evaporation apparatus according to claim 1 and including a cylinder of transparent material surrounding said filament and shielding the lower portion of said jar from molecular radiation from said filament.

3. Evaporation apparatus according to claim 2 wherein said cylinder of transparent material surrounding said filament extends upwardly to substantially the middle of said jar, and said metallic cylinder surrounding said heater unit and said carrier jig extends downwardly to substantially the middle of said jar.

ERNST WEBER.
STANLEY A. JOHNSON.

REFERENCES CITED

The following references are of record in the file of this patent:

UNITED STATES PATENTS

| Number | Name | Date |
|---|---|---|
| 929,017 | Reynard | July 27, 1909 |
| 2,026,086 | Farncomb | Dec. 31, 1935 |
| 2,239,452 | Williams et al. | Apr. 22, 1941 |
| 2,271,239 | Vokes | Jan. 27, 1942 |
| 2,273,941 | Dorn | Feb. 24, 1942 |
| 2,301,456 | Sabine | Nov. 10, 1942 |
| 2,338,234 | Dimmick | Jan. 4, 1944 |
| 2,391,595 | Richards et al. | Dec. 25, 1945 |
| 2,398,382 | Lyon | Apr. 16, 1946 |
| 2,447,789 | Barr | Aug. 24, 1948 |
| 2,453,141 | Lange | Nov. 9, 1948 |
| 2,469,929 | Osterberg et al. | May 10, 1949 |